UNITED STATES PATENT OFFICE.

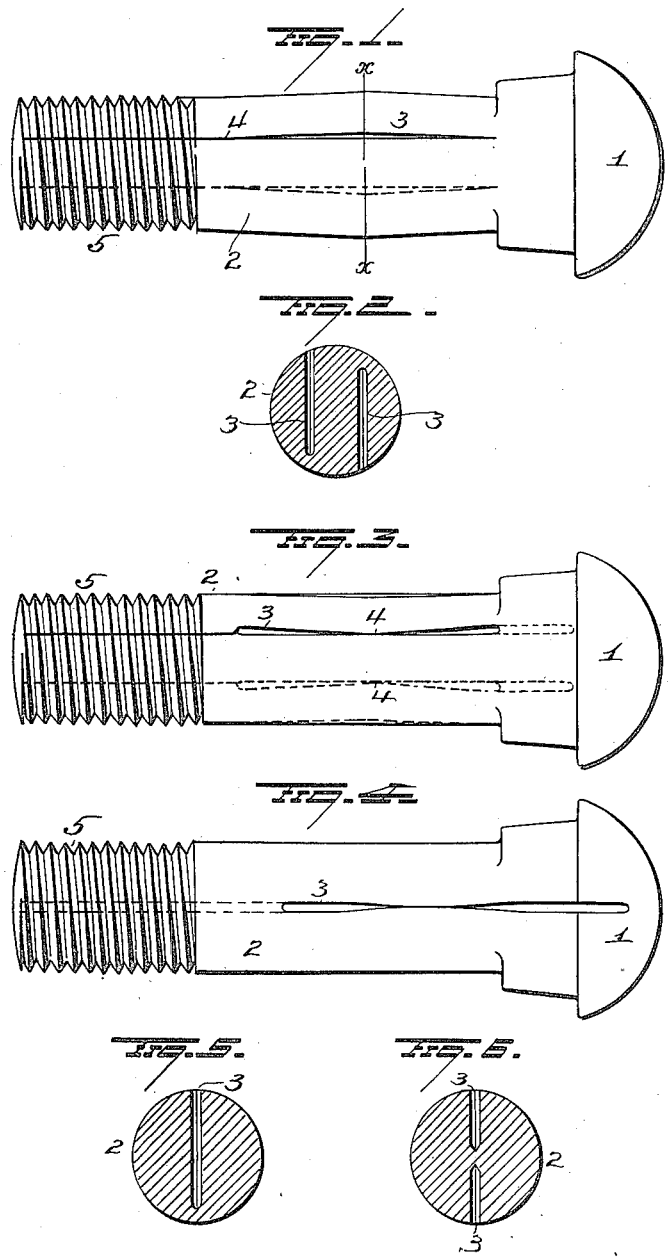

ETHAN I. DODDS, OF PITTSBURGH, PENNSYLVANIA, ASSIGNOR TO FLANNERY BOLT COMPANY, OF PITTSBURGH, PENNSYLVANIA.

BOLT.

1,163,897.  Specification of Letters Patent.  Patented Dec. 14, 1915.

Application filed March 15, 1915. Serial No. 14,496.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Bolts; and I do hereby declare the following to be a full, clear, and exact description of the invention, such as will enable others skilled in the art to which it appertains to make and use the same.

My invention relates to an improvement in bolts designed more particularly for railroad track construction, the object being to provide a bolt capable of slight lateral flexibility and elongation or spring action longitudinally, and which will resume its normal position and length after the stress has been removed, thus preventing the metal in the bolt from becoming permanently set, and removing to a large extent the tendency of the nuts to work loose.

With these objects in view my invention consists in the details of construction as will be more fully explained and pointed out in the claims.

In the accompanying drawings, Figure 1 is a view in elevation of a bolt embodying my invention; Fig. 2 is a view in section on the line *x—x* of Fig. 1; Fig. 3 is a view in elevation showing the slots closed at their centers; Fig. 4 is a view in elevation of a modification; Fig. 5 is a view in section of the same and Fig. 6 is a view in section of another modified form.

In the manufacture of the bolt, a round bar of steel is heated to the upsetting point and headed in dies in the usual manner, and while it is hot from the original heating or reheating, it is slotted from the juncture of the head 1 and shank 2, to a point adjacent the free end of the latter, the slots 3 preferably being located at opposite sides of the longitudinal center as shown in Fig. 2, and extending nearly but not all the way through the bolt. After the bolt has been slotted, which is preferably done by a machine or tool that does not cut away or remove any of the metal, it is subjected to pressure or forging action to partly close the slots as at 4 leaving a part of the slot open. In the construction shown in Fig. 1, an intermediate portion of the slot is left open and the ends thereof gradually closed. I prefer to close all those parts of the slots that extend into the threaded part of the shank, but this is not absolutely essential. The walls of the closed parts of the slots are not welded together, but simply brought into contact or nearly so, thus providing a limited lateral and longitudinal movement between the parts of the shank.

The threads 5 at the free end of the bolt may be hot or cold rolled, or they may be cut. During the process of manufacture, and before or after the threads have been cut, the bolts are tempered in oil, so as to increase their hardness without affecting their elasticity.

Instead of leaving the slots open or wider intermediate their ends, they may be closed at the center and open at the ends as in Fig. 3, and may also be continued into the head as shown in dotted lines in said figure, and in full lines in Fig. 4. In the latter figure but one slot is used and that is located centrally, and it may if desired be continued into the threaded part stopping short of the end. Instead of a single centrally located slot passing nearly but not quite through the bolt, I may use two centrally located slots stopping short of the center as shown in Fig. 6.

A steel bolt slotted as described is capable of slight elongation and a lateral or twisting movement, which permits it to give or yield under the pounding of the wheels on the rails at the joints, and immediately goes back to normal position as soon as the stresses are relieved. This prevents permanent elongation of the bolt and maintains the nut at all times under a pressure sufficient to prevent it from turning, as it does on ordinary bolts after usage sufficient to cause slight elongation of the bolt. By constructing the bolt so that it will yield under a pulling or twisting stress and then go back to its normal length, the nut will always be under at least the original pressure to which it was subjected when applied to the bolt.

Having fully described my invention what I claim as new and desire to secure by Letters-Patent, is:—

1. A bolt formed of a single piece of steel, slotted part way through, a part of said slot being left open, and part closed without welding the walls of said closed part of the slot.

2. A bolt formed of a single piece of steel slotted part way through, the slot extending into the threaded end of the bolt, a part of said slot being left with its walls separated, and part closed but not welded.

3. A bolt formed of a single piece of steel slotted part way through, the said slot extending into the head of the bolt, a part of the slot being left open and part closed but not welded.

In testimony whereof, I have signed this specification in the presence of two subscribing witnesses.

ETHAN I. DODDS.

Witnesses:
F. H. ALLISON,
EDWIN S. RYCE.